US012576596B2

(12) United States Patent (10) Patent No.: US 12,576,596 B2

Gommans et al. (45) Date of Patent: Mar. 17, 2026

(54) 3D PRINTER

(71) Applicant: SIGNIFY HOLDING B.V., Eindhoven (NL)

(72) Inventors: Hendrikus Hubertus Petrus Gommans, Meeuwen (NL); Marc Andre De Samber, Lommel (BE); Shahin Mahdizadehaghdam, Milpitas (CA); Vladimir Ossin, Astana (KZ)

(73) Assignee: SIGNIFY HOLDING B.V., Eindhoven (NL)

( * ) Notice: Subject to any disclaimer, the term of this patent is extended or adjusted under 35 U.S.C. 154(b) by 65 days.

(21) Appl. No.: 18/686,275

(22) PCT Filed: Aug. 22, 2022

(86) PCT No.: PCT/EP2022/073266

§ 371 (c)(1),
(2) Date: Feb. 23, 2024

(87) PCT Pub. No.: WO2023/025698

PCT Pub. Date: Mar. 2, 2023

(65) Prior Publication Data

US 2025/0187271 A1 Jun. 12, 2025

Related U.S. Application Data

(60) Provisional application No. 63/236,322, filed on Aug. 24, 2021.

(30) Foreign Application Priority Data

Aug. 31, 2021 (EP) ...................................... 21194127

(51) Int. Cl.
B29C 64/393 (2017.01)
B29C 64/209 (2017.01)
(Continued)

(52) U.S. Cl.
CPC .......... *B29C 64/393* (2017.08); *B29C 64/209* (2017.08); *B33Y 50/02* (2014.12); *B29C 64/118* (2017.08); *B33Y 30/00* (2014.12)

(58) Field of Classification Search
None
See application file for complete search history.

(56) References Cited

U.S. PATENT DOCUMENTS 10,265,911 B1 4/2019 Capri et al.
2014/0163717 A1 * 6/2014 Das ......................... C30B 13/28
700/119

(Continued)

FOREIGN PATENT DOCUMENTS

WO 2017143077 A1 8/2017

*Primary Examiner* — Yung-Sheng M Tsui
*Assistant Examiner* — Melody Tsui

(57) ABSTRACT

A 3D printer extruder unit (1) comprising a printing nozzle (2), a first temperature sensor (3), a second temperature sensor (4), and a processing unit (5) communicatively connected to the first temperature sensor (3) and the second temperature sensor (4). The processing unit (5) is configured to receive a sensor data from the first temperature sensor (3) and the second temperature sensor (4), compare the sensor data to a predefined threshold data and generate one or more of an alert and a control instruction for controlling one or more printing parameters of a 3D printer.

13 Claims, 2 Drawing Sheets

(51) Int. Cl.
   *B33Y 50/02*        (2015.01)
   *B29C 64/118*       (2017.01)
   *B33Y 30/00*        (2015.01)

(56)                References Cited

U.S. PATENT DOCUMENTS

| | | | |
|---|---|---|---|
| 2017/0361501 A1 | 12/2017 | van der Zalm et al. | |
| 2017/0368750 A1 | 12/2017 | Church et al. | |
| 2018/0229304 A1* | 8/2018 | Zettner | B29C 64/205 |
| 2018/0311727 A1* | 11/2018 | Willmann | B23K 35/0261 |
| 2018/0318933 A1 | 11/2018 | Myerberg et al. | |
| 2019/0047089 A1 | 2/2019 | Riemann | |
| 2020/0188307 A1* | 6/2020 | Freiderikos | B33Y 10/00 |
| 2021/0170682 A1 | 6/2021 | Cooper et al. | |
| 2021/0331419 A1* | 10/2021 | Yamazaki | B29C 64/106 |

* cited by examiner

3D PRINTER

CROSS-REFERENCE TO PRIOR APPLICATIONS

This application is the U.S. National Phase application under 35 U.S.C. § 371 of International Application No. PCT/EP2022/073266, filed on Aug. 22, 2022, which claims the benefit of U.S. Provisional Application No. 63/236,322, filed Aug. 24, 2021, and European Patent Application No. 21194127.3, filed on Aug. 31, 2021. These applications are hereby incorporated by reference herein.

FIELD OF THE INVENTION

The invention relates to a 3D printer extruder unit, and a 3D printer comprising a 3D printer extruder unit.

BACKGROUND OF THE INVENTION 3D printing is seen as a way forward to allow the flexible production of limited editions of components and products in a cost-effective manner.

One of the widely adopted 3D printing technologies is Fused Deposition Modelling (FDM). In FDM, a spool of a thermoplastic filament is fed to an extrusion head, heated, and extruded in a melted form via a nozzle. The melted material is extruded in a thin strand and is deposited layer-by-layer at predetermined locations, to form an object. The freshly deposited layer fuses with the layer deposited previously.

In an ideal world, full control over all relevant temperature parameters is possible during the extrusion process, e.g. temperatures of the extruded layer, the collecting layer, the ambient temperature at each location in the print platform. However, this is not the case in the real world, where the temperature parameters are hard to control and depend on a large variety of parameters such as printed part geometry, the chosen toolpath, and ambient surroundings. These issues are even more expressed for smaller format printers that offer fewer capabilities within thermal management.

U.S. Pat. No. 10,265,911 B1 discloses apparatuses and techniques for using an image-based monitoring and feedback system for three-dimensional printing. In some aspects, a camera captures images of objects being printed and an image-processing system compares the images with benchmark images to detect and correct differences between the object and the benchmark. The correction can be in real-time or applied to subsequent printing. Other aspects include a calibration system that prints predefined test objects and compares them to benchmarks to ensure that the printer operating parameters are properly set. The comparison can be manually performed by a user or automated as a part of the image-processing system.

However, monitoring the temperature of the 3D printing process and thermal management continues to be an issue.

SUMMARY OF THE INVENTION

It is an object of the present invention to overcome the above problems and to provide a 3D printer extruder unit enabling improved thermal management.

According to a first aspect of the invention, this and other objects are achieved by a 3D printer extruder unit for a 3D printer, the 3D printer extruder unit comprising:
  a printing nozzle configured for receiving a printing material and depositing said printing material, a first temperature sensor arranged at or near the printing nozzle and configured for measuring a first temperature of printing material deposited by the printing nozzle at a first position,
  a second temperature sensor arranged at or near the printing nozzle and configured for measuring a second temperature of printing material deposited by the printing nozzle at a second position, and wherein the first position is different from the second position, and
  a processing unit communicatively connected to the first temperature sensor and the second temperature sensor and configured to:
  receive a sensor data from the first temperature sensor and the second temperature sensor, wherein the sensor data comprises the first temperature and the second temperature,
  compare the sensor data to a predefined threshold data, and
  generate, based on the comparison between the sensor data and the predefined threshold data, one or more of an alert and a control instruction for controlling one or more printing parameters of a 3D printer.

Consequently, the processing unit may monitor the temperature and in case of the temperature going away or deviates from an acceptable range, it notifies an operator or directly controls one or more printing parameters of the 3D printer to correct the temperature error, thereby avoiding processing error. Furthermore, by providing two temperature sensors arranged to measure the temperatures at different positions, it facilitates that at least one sensor has a good field of view of the printing material deposited by the printing nozzle, especially in situations where complex geometrical structures are printed and it may be vital to have the sensors arranged to measure on different positions to achieve a good field of view. Having a good field of view helps in achieving a good signal to noise ratio, thus allowing for further analysis of the collected signal. Thus, a 3D printer extruder unit enabling improved thermal management is provided for.

The printing nozzle may be configured for being used in, but not limited to Fused Deposition Modelling (FDM). The printing nozzle may be configured to receive a thermoplastic filament, heat the filament to melt the filament, and then extrude the melted filament through the printing nozzle to deposit the melted filament. The melted filament is deposited layer-by-layer to achieve the desired shape.

The first temperature sensor and the second temperature sensor may be arranged at or near the printing nozzle. The first temperature sensor and the second temperature sensor may be arranged to move together with the printing nozzle during a printing process.

When using the wording that the first position is different from the second position, the intention generally is to encompass every constellation of positionings, e.g. including the first and second positions being on opposite sides of the printing nozzle, or the first and second positions being on the same side of the printing nozzle. In this connection, it is noted that a minor overlap between the first and second positions may be acceptable. Preferably, the positions are different from each other to achieve different fields of view for the temperature sensors.

The comparison of the sensor data to a predefined threshold data may be performed on the sensor signal information. Thereby, the translation of the sensor signal information into temperature, which would require detailed analysis, may be omitted.

Alternatively, a comparison of the sensor data to a predefined threshold data may be performed by the processing unit interpreting the sensor data to convert or translate it into a temperature. That may, however, require a few assumed or predetermined additional values for reference purposes. In this case, the sensor data may be temperature data and the predefined threshold data may be a predefined temperature threshold. Thus, the processing unit may in an embodiment be configured to compare the sensor data to a predefined threshold data by interpreting the sensor data to provide temperature data and compare the temperature data to a predefined temperature threshold data.

Although only a first temperature sensor and a second temperature sensor is mentioned, the 3D printer extruder unit may comprise three, four, five, or more temperature sensors each configured for measuring the temperature of deposited material at different positions.

The processing unit is a unit comprising any circuit and/or device suitably adapted to perform the functions described herein. The control unit may comprise general-purpose or proprietary programmable microprocessors, such as Digital Signal Processors (DSP), Application-Specific Integrated Circuits (ASIC), Programmable Logic Arrays (PLA), Field Programmable Gate Arrays (FPGA), special-purpose electronic circuits, etc., or a combination thereof. The processing unit may comprise a transmitter, a receiver, and/or a transceiver for transmitting and receiving signals.

The predefined threshold data may be a maximum temperature that should not be exceeded and/or may be a minimum temperature that the first and/or second temperature should be kept above. The predefined threshold data may be a range of temperatures that should not be exceeded. The predefined threshold data may be a predetermined predefined threshold data determined before the initiation of a printing process.

The predefined threshold data may comprise pre-recorded sensor data from an approved previous printing process performed by the 3D printer.

Consequently, an easy method for determining the right predefined threshold data is achieved. Furthermore, by using the sensor data from a previous printing process inherent differences in different 3D printers are accounted for, thus achieving a method suitable for a large variety of 3D printers. Furthermore, ambient conditions which may severely affect the outcome of a printing process are also accounted for by using pre-recorded sensor data.

The approval of the previous printing process may be carried out by an operator, e.g. by observation and/or manual measurements. Alternatively, the approval may be carried out automatically, e.g. by comparing the finished product of a printing process to a modeled point cloud of the desired product. In the context of the current disclosure, an approved printing process is to be understood as a printing process resulting in a product that has passed pre-set quality standards.

The predefined threshold data may be set as a range dependent on the pre-recorded sensor data, e.g. by setting the predefined threshold data as a range varying by a small amount from the pre-recorded sensor data, such as varying by 0 degrees Celsius-5 degrees Celsius from the pre-recorded sensor data.

The processing unit may be further configured to:
compare the sensor data to a noise threshold, and
based on the comparison between the sensor data and the noise threshold discard the sensor data if the noise threshold is not exceeded.

Consequently, discarding data based on a comparison with a noise threshold may ensure further processing and conclusions are not wrongfully based on low-quality data with a low signal-to-noise ratio.

The first temperature sensor and/or the second temperature sensor may be IR sensors.

Consequently, non-contact temperature sensors may be achieved, thus avoiding the risk of the temperature sensors deforming the deposited printing material while measuring the temperature of the deposited material.

The first temperature sensor and/or the second temperature sensor may comprise a cold shield for shielding away stray IR radiation from the first temperature sensor and/or the second temperature sensor.

Consequently, stray IR radiation from other sources than the printed material is shielded away, thus ensuring that interference from other heat sources is lowered or fully removed. The cold shield may reduce noise from external sources, thus leading to a better signal-to-noise ratio for the temperatures measured by the first temperature sensor and the second temperature sensor.

The processing unit may be configured to:
modulate a controlled temperature of the 3D printer, and
compare the sensor data to the modulation of the controlled temperature to estimate a noise level and/or improve a signal to noise ratio of the sensor data.

Consequently, by estimating the noise level of the sensor data the noise may be removed at least partly from the sensor data, thus achieving an improved signal-to-noise ratio. Also, it is thereby enabled that the sensing system is enabled to use the thus estimated noise level of the sensor data to improve the signal to noise ratio.

The controlled temperature may be a nozzle temperature, an ambient temperature, or a build plate temperature. The build plate is a plate on which printing material is deposited. An ambient temperature may be controlled via a fan setting, and/or by adjusting a chamber temperature of the associated 3D printer.

A controlled temperature may be modulated with an amplitude of 0.1 degrees Celsius-5 degrees Celsius and at a frequency of 0.1 Hz-10 Hz.

By using smaller modulations such as 0.1 degrees Celsius-5 degrees Celsius and at a frequency of 0.1 Hz-10 Hz it may be assured that the effects from the temperature modulation do not lead to the sensor data exceeding the predefined threshold data. Furthermore, smaller modulations may minimize any effects imparted by the modulation upon an ongoing printing process. Such modulations are regarded as sufficiently small enough not to exceed process threshold values. By reading the frequency signals that correspond to the modulation signal, the signal-to-noise ratio (SNR) may be improved significantly without altering the extrusion processing and temperature characterization setup. The signal modulation may be applied directly through the Arduino board as these frequencies are not addressed by the current machine code/readout.

The first temperature sensor and/or the second temperature sensor may be contact temperature sensors.

The contact temperature sensors may be slides or brushes. Preferably, the contact sensors are configured to have a small enough contact force to avoid deforming deposited material.

The printing nozzle comprises a nozzle opening, and at least one of the first, and second temperature sensors may be located in one of the following positions:
a position upstream of the nozzle opening during a 3D printing process such as to enable collecting sensor data indicative of a temperature of a layer while the layer is being deposited by the 3D printer extruder unit, and a position downstream of the nozzle opening during a 3D printing process such as to enable collecting sensor data indicative of a temperature of the latest deposited layer completed by the 3D printer extruder unit.

Consequently, the sensor data may give an insight into the cooling process of the deposited printing material.

In the context of this disclosure, when used herein in connection with a layer or filament of printing material, the term "latest" is intended to refer to the last layer of printing filament having been completed at a particular given point of time in a printing process.

In the context of this disclosure a position upstream of the nozzle opening is to be understood as a position behind the nozzle opening relative to, or when seen in, a printing direction in which the printing nozzle is moving during a printing process. By having the temperature sensor behind the nozzle opening relative to a printing direction it allows the temperature sensor to measure a temperature of a layer while the layer is being deposited by the 3D printer extruder unit.

In the context of this disclosure, when used herein in connection with a layer or filament of printing material, the term "being deposited" is intended to refer to the layer or filament that is exiting the nozzle and to be deposited as a layer.

In the context of this disclosure a position downstream of the nozzle opening is to be understood as a position in front of the nozzle opening relative to, or when seen in, a printing direction in which the printing nozzle is moving during a printing process. By having the temperature sensor in front of the nozzle opening relative to a printing direction it allows the temperature sensor to measure the temperature of the latest deposited layer completed by the 3D printer extruder unit.

In an embodiment at least one of the first and second temperature sensors are chosen from the group comprising non-contact temperature sensors, thermopiles, contact temperature sensors and brush/slide temperature sensors.

At least one of the first, and second temperature sensors may be chosen from the group comprising contact temperature sensors and brush/slide temperature sensors, and a contact force is applied to at least one of the first and second sensors to provide contact between the respective sensor and the 3D printing material is chosen to be smaller than a force determined to deform the 3D printing material.

The printing nozzle may comprise a nozzle opening, and the first and second temperature sensors may be located in a position at or near the nozzle opening.

The printing nozzle may comprise a nozzle opening, and wherein the first and second temperature sensors are located within 2 cm of the nozzle opening.

The temperature sensors may be arranged in accordance with their field of view, i.e. the area from which sensor data is collected. Consequently, if the sensors have a large field of view, they may be placed further away from the nozzle opening, than if the sensors have a small field of view. The temperature sensors may be arranged to have an overlapping field of views, the field of view may overlap 0% to 10%, preferably 1% to 5%. Generally, the location of the sensors may be related to the field of view of the sensors such that it may be prevented that the sensor picks up signals from the nozzle head itself.

The 3D printer extruder unit may further comprises:

a third temperature sensor arranged at or near the printing nozzle and configured for measuring the third temperature of printing material deposited by the printing nozzle at a third position, and wherein the third position is different from the first position and the second position, a fourth temperature sensor arranged at or near the printing nozzle and configured for measuring a fourth temperature of printing material deposited by the printing nozzle at a fourth position, and wherein the fourth position is different from the first position, the second position, and the third position, and wherein the first temperature sensor, the second temperature sensor, the third temperature sensor, and the fourth temperature sensor are arranged symmetrically relative to each other around the printing nozzle.

Having the temperature sensors arranged symmetrically around the printing nozzle may ensure that at least one or more of the temperature sensors has a good field of view of material deposited by the printing nozzle. Furthermore, by arranging four temperature sensors symmetrically around the printing nozzle it may be assured that no matter the printing direction of the 3D printer extruder unit at least one temperature sensor will be upstream of the 3D printer extruder unit and at least one temperature sensor will be downstream of the 3D printer extruder unit.

The processing unit may be configured to compare the sensor data to a predefined threshold data by interpreting the sensor data to provide temperature data and compare the temperature data to a predefined temperature threshold data.

The processing unit may have a computational ability to perform a comparison between two or more data. The processing unit may also determine temperature from raw sensor data.

According to a second aspect of the invention, the objects of the invention and other objects are achieved by a 3D printer comprising a 3D printer extruder unit according to the first aspect of the invention.

It is noted that the invention relates to all possible combinations of features recited in the claims.

BRIEF DESCRIPTION OF THE DRAWINGS

This and other aspects of the present invention will now be described in more detail, with reference to the appended drawings showing an embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
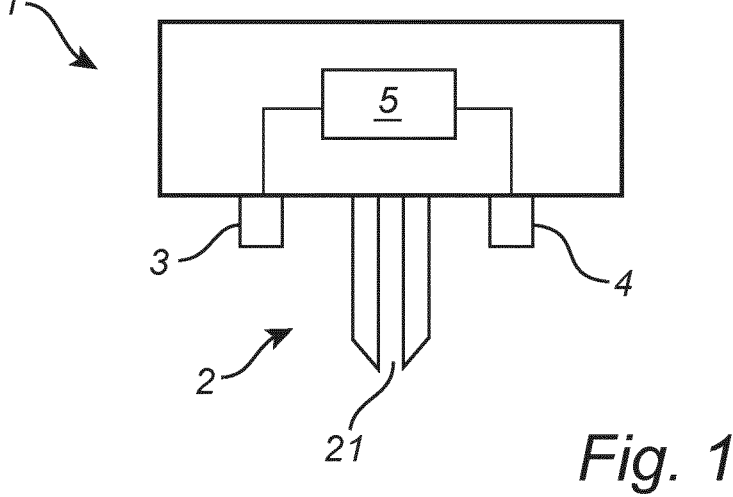
FIG. 1 depicts a schematic cross-sectional view of a 3D printer extruder unit.

Referring initially to FIG. 1, a schematic cross-sectional view of a 3D printer extruder unit 1 is shown. The 3D printer extruder unit 1 comprises a printing nozzle 2, a first temperature sensor 3, a second temperature sensor 4, and a processing unit 5.

The printing nozzle 2 is configured for receiving a printing material and depositing said printing material. The printing nozzle 2 is provided with a nozzle opening 21 allowing printing material to be deposited through the said nozzle opening 21. During a printing process a filament is received by the 3D printer extruder unit 1 and heated up, the heated-up filament is passed through the printing nozzle 2 and deposited onto a collector plate (not shown) via the nozzle opening 21.

The first temperature sensor 3 is arranged near the printing nozzle 2 and configured for measuring the first temperature of printing material deposited by the extruder unit 1 at a first position. The first temperature sensor 3 is an IR sensor configured for measuring the temperature of material deposited by the printing nozzle 2. The second temperature sensor 4 is arranged near the printing nozzle 2 and configured for measuring a second temperature of printing material deposited by the extruder unit 1 at a second position. The second temperature sensor 4 is an IR sensor configured for measuring the temperature of material deposited by the printing nozzle 2.

The processing unit 5 is communicatively connected to the first temperature sensor 3 and the second temperature sensor 4. The processing unit 5 is configured to receive sensor data from the first temperature sensor 3 and the second temperature sensor 4. The sensor data received by processing unit 5 comprises the first temperature and the second temperature measured by the first temperature sensor 3 and the second temperature sensor 4, respectively. The processing unit 5 is configured to compare the received sensor data to a predefined threshold data. The predefined threshold data may be a predetermined predefined threshold data. The predefined threshold data may comprise pre-recorded sensor data from an approved previous printing process performed by the 3D printer extruder unit 1. The processing unit 5 is further configured to generate, based on the comparison between the sensor data and the predefined threshold data, one or more of an alert and a control instruction for controlling one or more printing parameters of a 3D printer.

The processing unit 5 may further be configured to modulate a controlled temperature of the 3D printer in which the 3D printer extruder unit is mounted 1. The processing unit 5 may modulate the controlled temperature with different amplitudes and frequencies, such as an amplitude of 0.1° C.-5° C. and a frequency of 0.1 Hz-10 Hz.

The processing unit 5 may further be configured to compare the sensor data to the modulation of the controlled temperature to estimate a noise level of the sensor data.

Figure 2:
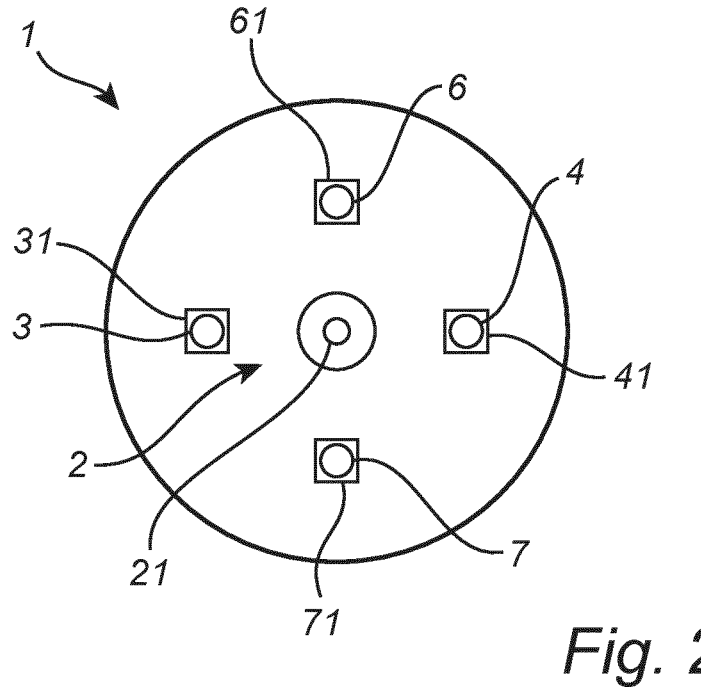
FIG. 2 depicts a schematic bottom view of a 3D printer extruder unit.

Referring to FIG. 2, a schematic bottom view of a 3D printer extruder unit 1 is shown. The 3D printer extruder unit 1 comprises a first temperature sensor 3 arranged near the printing nozzle 2 and configured for measuring a first temperature of printing material deposited by the printing nozzle 2 at a first position. The 3D printer extruder unit 1 further comprises a second temperature sensor 4 arranged near the printing nozzle 2 and configured for measuring a second temperature of printing material deposited by the printing nozzle 2 at a second position. The 3D printer extruder unit 1 further comprises a third temperature sensor

6 arranged near the printing nozzle 2 and configured for measuring a third temperature of printing material deposited by the printing nozzle 2 at a third position. The 3D printer extruder unit 1 further comprises a fourth temperature sensor 7 arranged near the printing nozzle 2 and configured for measuring a fourth temperature of printing material deposited by the printing nozzle 2 at a fourth position. The first, second, third, and fourth temperature sensor 3, 4, 6, and 7 each comprise an associated cold shield 31, 41, 61, 71 for shielding away stray IR radiation from the first, second, third, fourth temperature sensor 3, 4, 6, and 7. The first temperature sensor 3, the second temperature sensor 4, the third temperature sensor 6, and the fourth temperature sensor 7 are arranged symmetrically relative to each other around the printing nozzle 2. One or more of the cold shields 31, 41, 61, 71 may be omitted. Furthermore, it is also feasible to provide a 3D printing extruder unit according to the invention with another number of temperature sensors than two or four, such as e.g. three temperature sensors or five or more temperature sensors. It is noted that one or more of the first, second, third, and fourth temperature sensor 3, 4, 6, and 7 may also be arranged at or adjacent to the printing nozzle 2.

Figure 3:
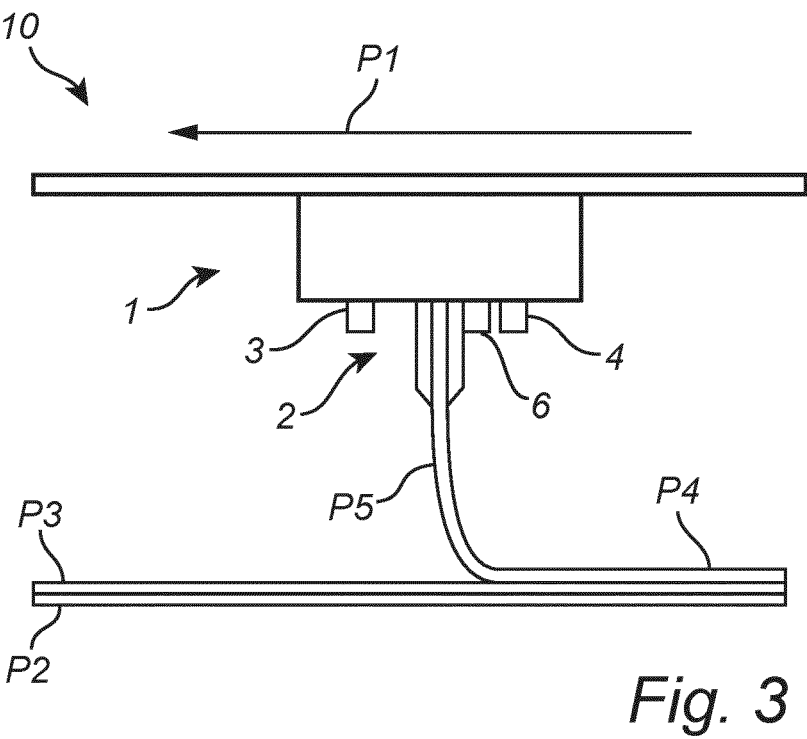
FIG. 3 depicts a schematic cross-sectional view of a 3D printer.

Referring to FIG. 3 a schematic cross-sectional view of a 3D printer 10 is shown. The 3D printer 10 comprises a 3D printer extruder unit 1. The 3D printer extruder unit 1 comprises a first temperature sensor 3 located in a position downstream of the nozzle opening 21 during a 3D printing process such as to enable collecting sensor data indicative of a temperature of the latest deposited layer P3 completed by the 3D printer extruder unit 1. The 3D printer extruder unit 1 comprises a second temperature sensor 4 located in a position upstream of the nozzle opening 21 during a 3D printing process such as to enable collecting sensor data indicative of a temperature of a layer P4 while the layer P4 is being deposited by the 3D printer extruder unit 1. During a printing process, the 3D printer extruder unit 1 is moved in a printing direction P1 while depositing printing layers P2, P3, and P4. During the printing process, the first sensor 3 is arranged in front of the printing nozzle 21 while the 3D printer extruder unit 1 is moved along the printing direction P1, and the second sensor 4 is arranged behind the printing nozzle 21 while the 3D printer extruder unit 1 is moved along the printing direction P1. The first temperature sensor 3 and the second temperature sensor 4 are both non-contact temperature sensors configured for measuring the temperature of deposited material from a distance. The first sensor 3 may thus measure the temperature of the printing layer P3. The second sensor may thus measure the temperature of the freshly deposited printing layer P4, or the temperature of the printing material P5 shortly after leaving the printing nozzle 21.

The 3D printer extruder unit 1 comprises four temperature sensors (cf. FIG. 2), the first sensor 3 may e.g. measure the temperature of the printing layer P3. The second sensor may e.g. measure the temperature of the freshly deposited printing layer P4. The third temperature sensor 6 may e.g. measure the temperature of the printing material P5 shortly after leaving the printing nozzle 21, i.e. the printing material that has just exited the nozzle opening and that is forming the freshly deposited printing layer P4. In this case, the third temperature sensor 6 or any other sensor for that matter may need to be configured such that the field of view of the sensor sufficiently focuses or overlap the printing material P5 shortly after leaving the printing nozzle 21, in order to measure its (P5) temperature. So the sensor may be placed very close to the nozzle and facing in direction of the printing material P5 that is in the process of leaving the printing nozzle 21. The fourth temperature sensor 7 may e.g. measure the temperature of a previously deposited printing layer P2 below the printing layer P3. Hence, the relative position of the temperature sensor with respect to the printing nozzle may be used to measure various temperatures of the printing or printed material, which are of interest in determining the quality of the printing process or the product.

Especially, collecting temperature information of one or more previously deposited printing layers (from an earlier nozzle pass), such as printing layers P3 or P2 or even a not shown printing layer below printing layer P2 provides insight into the cooling process. By using time-linking, i.e. by knowing the time elapsed since the deposition of the material that comes within the area of detection of the thermal sensor after a pass, the thermal properties, such as the cool down in the given conditions, can be deduced. This provides an additional parameter for comparison with previous (good, calibrated) print runs.

Figure 4:
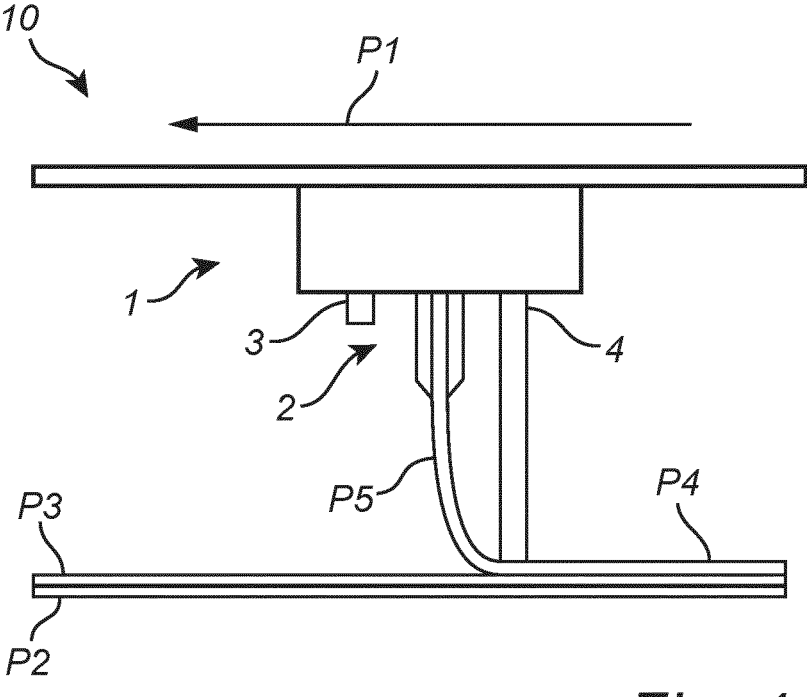
FIG. 4 depicts a schematic cross-sectional view of a 3D printer.

Referring to FIG. 4 a schematic cross-sectional view of a 3D printer 10 is shown. The 3D printer 10 differs from the one shown in FIG. 3 in that the second temperature sensor 4 is a contact temperature sensor configured for measuring the temperature of deposited material by contacting it. The second temperature sensor 4 being a contact temperature sensor such as a brush/slide temperature sensor. A contact force applied to the second sensor 4 to provide contact between the second sensor 4 and the 3D printing material is chosen to be smaller than a force determined to deform the 3D printing material.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A 3D printer extruder unit for a 3D printer comprising:
a printing nozzle configured for receiving a printing material and depositing said printing material, the printing nozzle comprising a nozzle opening,
a first temperature sensor arranged at or near the printing nozzle and configured for measuring a first temperature of printing material deposited by the printing nozzle at a first position,
a second temperature sensor arranged at or near the printing nozzle and configured for measuring a second temperature of printing material deposited by the printing nozzle at a second position, and wherein the first position is different from the second position, and
a processing unit communicatively connected to the first temperature sensor and the second temperature sensor and configured to:
receive a sensor data from the first temperature sensor and the second temperature sensor, wherein the sensor data comprises the first temperature and the second temperature,
compare the sensor data to a predefined threshold data, and generate, based on the comparison between the sensor data and the predefined threshold data, one or more of an alert and a control instruction for controlling one or more printing parameters of a 3D printer,
wherein, during a 3D printing process, the first temperature sensor is located in a position downstream of the nozzle opening such as to enable collecting sensor data indicative of a temperature of the latest deposited layer completed by the 3D printer extruder unit, and the second temperature sensor is located in a position upstream of the nozzle opening such as to enable collecting sensor data indicative of a temperature of a layer while the layer is being deposited or already deposited by the 3D printer extruder unit; and
wherein the processing unit is configured to modulate a controlled temperature of the 3D printer, wherein the controlled temperature is one or more of a nozzle temperature, an ambient temperature, or a build plate temperature, and
compare the sensor data to the modulation of the controlled temperature to estimate a noise level and/or improve a signal to noise ratio of the sensor data.

2. A 3D printer extruder unit according to claim 1, wherein the predefined threshold data comprises pre-recorded sensor data from an approved previous printing process performed by the 3D printer.

3. A 3D printer extruder unit according to claim 1, wherein the first temperature sensor and/or the second temperature sensor are IR sensors.

4. A 3D printer extruder unit according to claim 3, wherein the first temperature sensor and/or the second temperature sensor comprises a infrared (IR) shield for shielding away stray IR radiation.

5. A 3D printer extruder unit according to claim 1, wherein the processing unit modulates the controlled temperature with an amplitude of 0.1 degrees Celsius-5 degrees Celsius and at a frequency of 0.1 Hz-10 Hz.

6. A 3D printer extruder unit according to claim 1, wherein the first temperature sensor and/or the second temperature sensor are contact temperature sensors.

7. A 3D printer extruder unit according to claim 1, wherein at least one of the first and second temperature sensors are chosen from the group comprising non-contact temperature sensors, thermopiles, contact temperature sensors and brush/slide temperature sensors.

8. A 3D printer extruder unit according to claim 1 wherein at least one of the first and second temperature sensors are chosen from the group comprising contact temperature sensors and brush or slide temperature sensors, and wherein a contact force is applied to at least one of the first and second sensors to provide contact between the respective sensor and the 3D printing material is chosen to be smaller than a force determined to deform the 3D printing material.

9. A 3D printer extruder unit according to claim 1, wherein the printing nozzle comprises a nozzle opening, and wherein the first and second temperature sensors are located in a position at or near the nozzle opening.

10. A 3D printer extruder unit according to claim 1, wherein the printing nozzle comprises a nozzle opening, and wherein at least one of the first and second temperature sensors is located within 2 cm of the nozzle opening.

11. A 3D printer extruder unit according to claim 1, further comprising:
a third temperature sensor arranged at or near the printing nozzle and configured for measuring a third temperature of printing material deposited by the printing nozzle at a third position, and wherein the third position is different from the first position and the second position, a fourth temperature sensor arranged at or near the printing nozzle and configured for measuring a fourth temperature of printing material deposited by the printing nozzle at a fourth position, and wherein the fourth position is different from the first position, the second position, and the third position, and wherein the first temperature sensor, the second temperature sensor, the third temperature sensor, and the fourth temperature sensor are arranged symmetrically relative to each other around the printing nozzle.

12. A 3D printer extruder unit according to claim 1, wherein the processing unit is configured to compare the sensor data to a predefined threshold data by interpreting the sensor data to provide temperature data and compare the temperature data to a predefined temperature threshold data.

13. A 3D printer comprising a 3D printer extruder unit according to claim 1.

* * * * *